June 17, 1930.  H. F. WILHELM  1,764,767

AUTOMATIC BELT TIGHTENING DEVICE

Filed May 24, 1927

INVENTOR
*Harold F. Wilhelm,*
BY *Albert M. Austin*
ATTORNEY

Patented June 17, 1930

1,764,767

UNITED STATES PATENT OFFICE

HAROLD F. WILHELM, OF EAST ORANGE, NEW JERSEY, ASSIGNOR TO VERNE E. MINICH, OF SCARSDALE, NEW YORK

AUTOMATIC BELT-TIGHTENING DEVICE

Application filed May 24, 1927. Serial No. 193,772.

The invention relates to a power transmission device, and, more particularly, to a power transmission device which may serve as an automatic belt tightener.

According to the invention a power transmission device is provided which, in one form of the invention, may comprise a relatively large annular gear having internal teeth fixedly mounted on a supporting shaft. A connecting arm may be loosely mounted on the shaft and have journaled therein a second shaft carrying a spur gear having driving relation with the annular gear. The second shaft may also have fixedly mounted thereon a belt pulley.

If desired, a housing taking the place of the arm may be provided, surrounding the annular and spur gears. The provision of an annular gear having a spur gear within not only makes for a compact structure but also has certain operating advantages. The device may perform the combined functions of a belt tightener, speed changer and shock absorber. The device may be constructed in the form of an attachment and may be used either on the driving or driven shaft.

Various other features and advantages of the invention will be apparent from the following particular description and from an inspection of the accompanying drawings.

The invention also consists in certain new and original features of construction and combinations of parts hereinafter set forth and claimed.

Although the novel features which are believed to be characteristic of this invention will be pointed out with particularity in the claims appended hereto, the invention itself, as to its objects and advantages, the mode of its operation and the manner of its organization may be better understood by referring to the following description taken in connection with the accompanying drawings forming a part thereof, in which Fig. 1 is an elevation, partly in section, of one embodiment of the invention.

Figure 1:
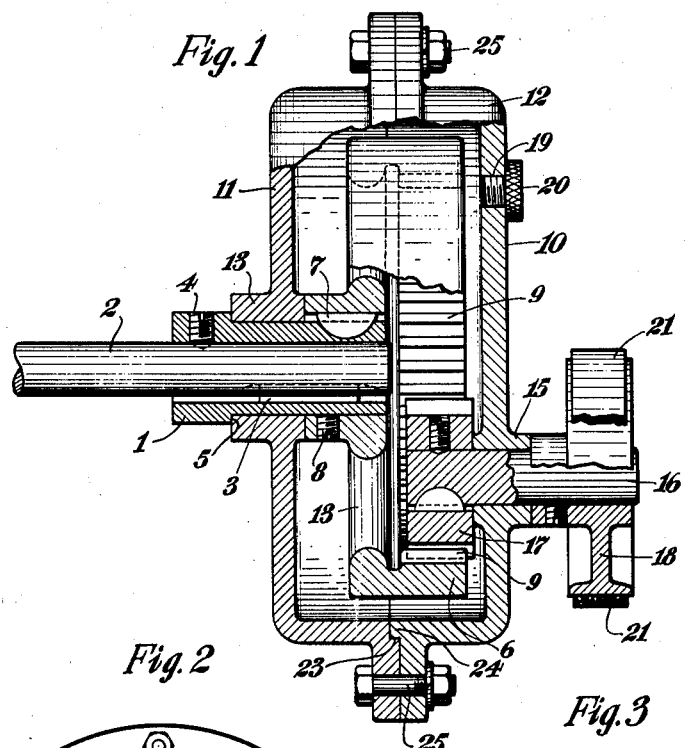

In the following description and in the claims parts will be identified by specific names for convenience, but they are intended to be as generic in their application to similar parts as the art will permit.

Like reference characters denote like parts in the several figures of the drawings.

Figure 2:
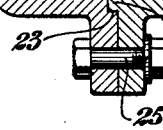
Fig. 2 is an end elevation of the device as shown in Fig. 1.

Referring now to the drawing and more particularly to Figs. 1 and 2, the device is shown in the form of an attachment having a sleeve 1 which may be rigidly secured upon a supporting shaft 2 by means of a key 3 and set-screw 4.

The sleeve 1 has, at one end, an annular shoulder 5 and, at the other end, an annular gear 6 which is fixedly secured thereon by means of a suitable key 7 and set-screw 8. The annular gear 6 may have spokes 13 for lightness and internal teeth 9.

Surrounding the annular gear 6 is a casing 10 made up of sections 11 and 12. The section 11 has a hub 13 which is journaled on the sleeve between the shoulder 5 and the gear 6. The section 12 has a hub 15 having rotatably mounted therein a shaft 16 which has mounted thereon a spur gear 17 whose teeth mesh with the teeth 9 of the annular gear 6. The spur gear 17 may be fixedly secured on the shaft 16 in any desired manner as by means of a suitable key and set-screw.

Mounted on shaft 16 is a belt pulley 18 fixedly secured thereon by means of a key and a set screw as is well understood in the art. A belt 21 is shown riding on the belt pulley. The section 12 has an opening 19 which may be closed by a suitable plug 20 threaded therein. This opening 19 is for the purpose of filling the casing with oil or other lubricant.

The section 11 is provided with an annular seat 23 in which may be seated an annular projection 24 on the section 12 to insure the sections being connected in proper alignment. Suitable fastening devices 25 may thread the flanges on the sections 11 and 12 to hold the sections together.

Figure 3:
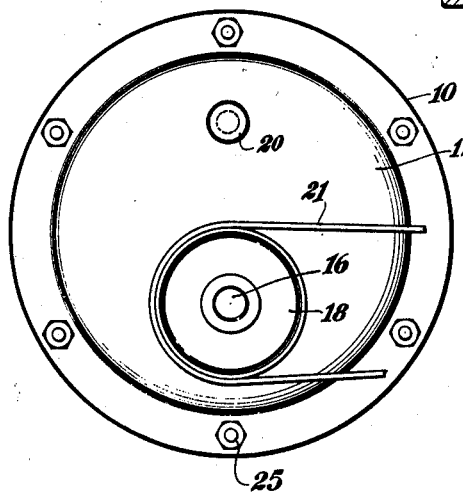
Fig. 3 is a side elevation, partly in section of another embodiment of the invention.
Figure 3:
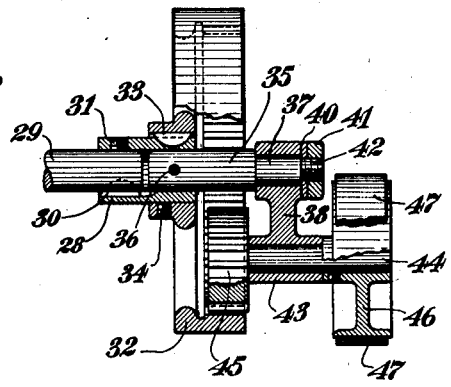

Referring now to Fig. 3, the device is shown with a simple arm in place of the casing. The sleeve 28 is rigidly secured to a supporting shaft 29 by means of a suitable key 30 and set-screw 31. The sleeve 28 has secured thereon an annular gear 32 by means of a suitable key 33 and set screw 34 and has disposed therein a shaft 35 suitably fixed in position by a pin 36. The outer end of the stub shaft 35 has a reduced bearing portion 37 on which is mounted a simple arm 38 and a further reduced portion 42. A suitable washer 40 is disposed on the reduced portion and a nut 41 is threaded thereon to jam the washer 40 against the shoulder formed by the reduced portion 42.

The lower end of the arm 38 is provided with a sleeve 43 in which is journaled a shaft 44 having fixedly mounted thereon a spur gear 45 meshing with the annular gear. The shaft 44 has also fixedly secured thereon a drive pulley 46 supporting a belt 47.

Although certain specific means have been shown for fixing the several elements on the several shafts for purposes of illustrating the invention, it will be understood that any of the usual expedients for this purpose can be used within the teachings of the invention.

The kinematic action of both species is substantially identical. The devices may be used either on driving or driven shafts. In either case when the rotation of the pulley is right, the risistance of the load will cause the smaller or spur gear to creep around the center of the larger or annular gear to tighten the belt. This creeping action will occur until the tension of the belt is sufficient to overcome it. The greater the load, the more the creeping action and the tighter the belt will become. Thus the devices are inherently automatic belt tighteners.

The devices are also shock absorbers, since, if the load is suddenly increased, an appreciable time must elapse before the smaller gear can creep sufficiently to tighten the belt, during which time the belt may slip slightly, absorbing the shock. The devices are also speed changers, the speed being decreased if the devices are used on the driven shaft and increased if used on a driving shaft.

The devices are rugged, efficient and compact. The position of the small gear within the large gear provides the desired kinematic action in the least space. The device shown in Figs. 1 and 2 having a housing or casing surrounding the gears has the additional advantage of insurance of the continual excellent lubrication, as well as protection from dirt.

Under certain conditions it may be of advantage to use the spur gear shaft as the supporting shaft and mount the pulley on the annular gear shaft.

If the devices be used as shown in the drawings with the supporting shaft as the driven shaft, the pulleys must be rotated in such direction that the lower side of the belt is the tight side. The upper side of the belt being loose operates to give maximum arc of contact between belt and pulleys.

Although the invention is generally most useful when used with ordinary pulleys and belts utilizing the friction therebetween to obtain driving relation, the invention may also be used with any kind of band and wheel driving arrangement, such as with a sprocket and chain.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What is claimed is:

1. A belt tightening power transmission device comprising a sleeve adapted to be fixedly secured to a supporting shaft, an annular gear having internal teeth and fixedly secured to said sleeve, a split casing comprising sections, the first section having a bearing journaled on said sleeve, the second section having a bearing at a point spaced from the first bearing, a shaft in said second bearing having a spur gear meshing with said annular gear, a pulley outside said second section on said shaft, one of said sections having an annular seat for the other, and means for holding said sections together.

2. A belt tightening power transmission device comprising a sleeve adapted to be fixedly secured to a supporting shaft, an annular gear having internal teeth and fixedly secured to said sleeve, a casing having a first bearing journaled on said sleeve, a second bearing at a point spaced from the first bearing, a shaft in said second bearing having a spur gear meshing with said annular gear, said casing enclosing said gears, a pulley outside said casing on said shaft.

In testimony whereof I have hereunto set my hand.

HAROLD F. WILHELM.